B. S & M. R. Pierce.
Making Drain-Pipes.
No. 2841 Reissued Jan. 14, 1868.
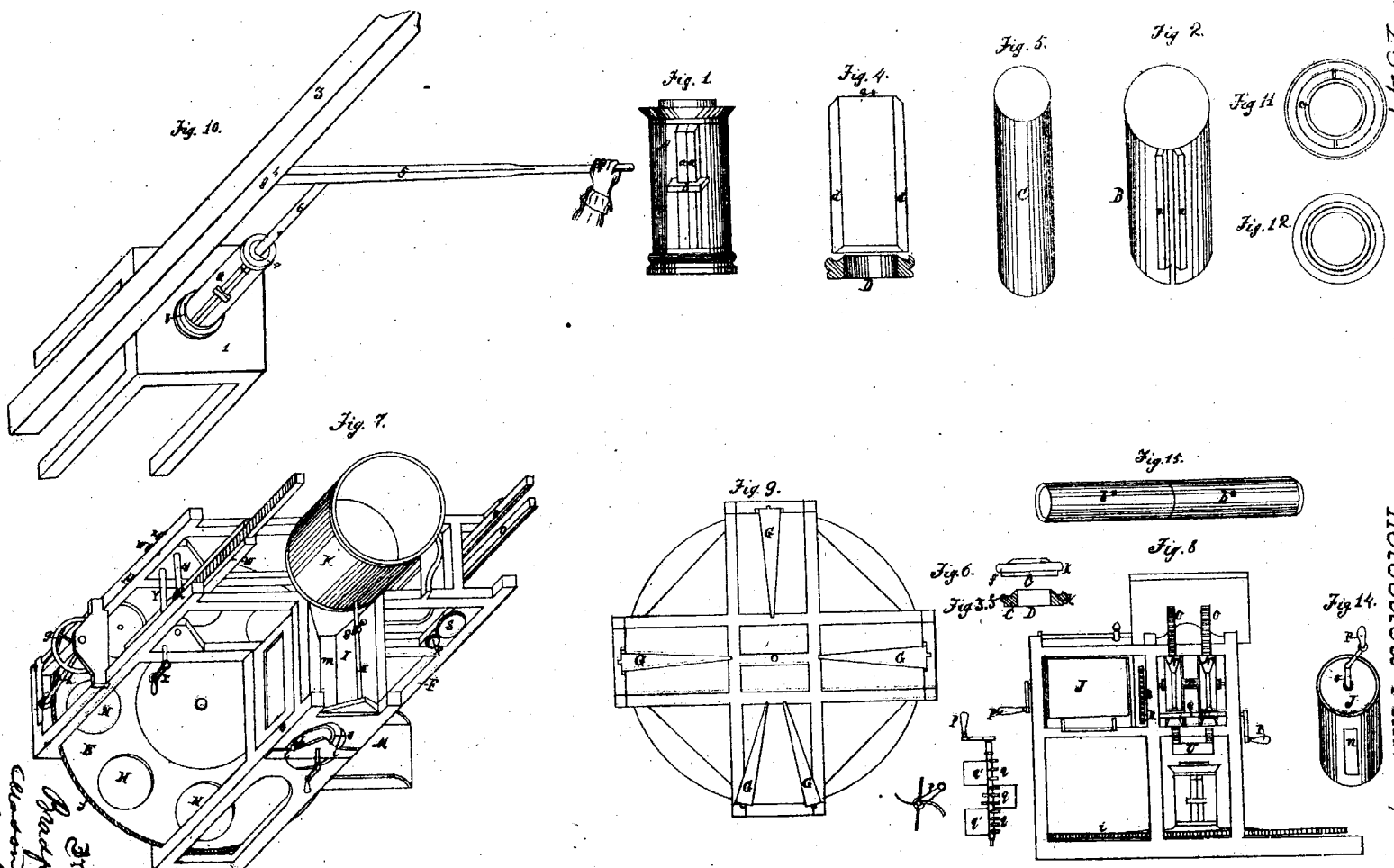
Inventors
Bradford S. Pierce,
Gleason R. Pierce
By B. F. & D. Cozzens,
their attys

United States Patent Office.

BRADFORD S. PIERCE, OF NEW BEDFORD, MASSACHUSETTS, AND MASON R. PIERCE, OF WOODSTOCK, NEW YORK.

*Letters Patent No.* 23,703, *dated April* 19, 1859; *reissue No.* 1,897, *dated February* 28, 1865; *reissue No.* 2,841, *dated January* 14, 1868.

IMPROVED MACHINE FOR MAKING DRAIN-PIPES.

The Schedule referred to in these Letters Patent and making part of the same.

TO ALL WHOM IT MAY CONCERN:

Be it known that we, BRADFORD S. PIERCE, of New Bedford, in the State of Massachusetts, and MASON R. PIERCE, of Woodstock, in the State of New York, have invented a new and useful Improvement in Moulds for the Manufacture of Pipes or Tubes for Drains, Flues, or other similar purposes, and also in machinery to be used in connection therewith; and we do hereby declare that the following is a full, clear, and exact description of the same, reference being had to the drawing, which accompanies and forms a part of this specification.

Letters Patent of the United States were heretofore, on the first day of August, 1854, obtained by the said Bradford S. Pierce, together with one Charles M. Pierce, for an "Improvement in Moulds for Cement or Earthen Tubes," consisting principally of what is termed, in said patent, a "spring case," to be used in combination with a core for moulding pipes of the description mentioned.

In making use of said improvement, it has been customary, after the pipe is moulded, and the core and case removed, to place the pipe on its side, and let it stand until it is fully "set." This method of operation answers an excellent purpose for making pipes of comparatively small diameter; but, when applied to large pipes, say of eight inches in diameter, experience has shown that the weight of the pipe, when the latter is laid upon its side, will cause the pipe, before it has set, to sag down, and become more or less oval in shape, thereby greatly diminishing its value for use. It is mainly to remedy this evil that we have devised our present improvements; and to this end our inventions consist—

First. Of a new and improved mould, composed of a case, a suitable core, and what we term a "core-socket," whereby we are enabled to mould drain-pipe and other similar articles with very great rapidity and economy.

Second. Of the combination, with the other parts of the mould, of a core-socket, made separate and distinct from these other parts, and so formed, and so combined with them, that it is capable of being connected with them when the mould is ready for use, and of being continuously kept connected with them during the entire process of moulding and finishing the pipe, so that the core can be discharged from the mould, through the socket and pipe, at the same place in the apparatus where the moulding and finishing is performed, and whereby, also, the core and pipe can be freed from the mould, after the pipe is finished, without the pipe and mould-case being required to be turned end for end, which is an inconvenient operation in practice, and which, from the greenness of the pipe, is liable to cause the latter to crack or spring out of shape. In this form, this portion of our invention constitutes the subject of the second claim of the present patent.

Third. Of certain improved machinery, which may be advantageously used in connection with our mould, and which is hereinafter fully described. In the accompanying drawing—

Figure 1 represents a front elevation of our mould, which constitutes a part of our invention.

Figure 2 is a perspective view of the "case" portion of said mould.

Figure 3 is a vertical cross-section of the "core-socket" portion thereof.

Figure 4 is another vertical section of said core-socket, and also of a finished pipe, as made in our mould.

Figure 5 is a perspective view of the core used with our mould.

Figure 6 is a side elevation of the bevel-ring, which forms the concaved end of the pipe.

Figure 7 is a perspective view of our improved machinery, for use, when desired, in connection with our mould.

Figure 8 is a front elevation of said machinery, showing a mould in proper position for forming a pipe.

Figure 9 is a plan of a portion of the said machinery.

Figure 10 is a perspective view of a modification of our said machinery, showing a very simple form thereof.

Figures 11, 12, 13, and 14 are details of some of the same parts represented in the other figures, and Figure 15 is a perspective view of two lengths of finished pipe, represented as put together for use.

In all the figures, similar letters denote similar parts.

To enable those skilled in the art to construct and employ our inventions, we will proceed to describe one mode in which we have successfully put them in operation.

In fig. 1 is represented our improved mould, with its different parts put together as they are when in use. The case B of this mould is made of thin metal, or of any other proper material, and is capable of being opened, and is provided with means of fastening the sides together, which, in the form shown in the drawing, is effected by securing strips of wood or other material, *a a*, to these sides, and holding them closely together by the clamp *b*.

The core C is of wood, metal, or other proper material, and, when the mould is ready for use, the case is made to stand over it, as seen at fig. 1, and is, by the stay *c*, fig. 11, retained at any desired equal distance from it all round, the space left between the core and the case being the same in width as the intended thickness of the walls, *d d*, of the pipe to be moulded.

The core-socket D is a very important part of our invention, and, as shown in the drawing, is in shape somewhat like a short cylinder, and is hollow, having an internal diameter just great enough to permit the core to be made to pass through it, when desired, without the expenditure of very considerable force, and, when constructed in the manner which we prefer, is, at its upper edge, provided with a bevelled ring, which, in the moulding, serves to form the concaved lower end of the pipe, and also with a flange or lip, *f*, which, when the case is in place, holds it externally in proper position in the mould.

The machinery which we have devised, to be employed, when desired, in connection with our mould, consists of a platform, E, fig. 7, which is capable of being revolved within the framework F, upon the conical rollers G′, seen at fig. 9, by means of the hand-wheel *g*. This hand-wheel is fixed upon the upper end of a vertical spindle, *h*, working in suitable bearings in the framework, and having, at its other end, a pinion, *i*, which gears, with teeth *j*, on the perimeter of the platform E. H H are apertures in the platform, in which moulds, constructed in the manner already described, are to be set, to be carried around on the platform, to be filled and then emptied for use again. In order to properly secure the moulds in the apertures while these operations are being performed, we have preferred to make our core-sockets with a shoulder, *k*, formed by the under side of the projecting lip *f*, and to give to the apertures a diameter just great enough to receive the lower part, *l*, of the core-sockets with a snug fit, letting the shoulder rest on the top of the platform, so that the entire mould may be readily and securely retained in an upright position while on the platform, and may also be easily removed when it is desired to discharge from it the finished pipe.

I is a hopper, with an open bottom, *m*, secured at one side of the framework F; and in it are placed the ingredients of which the pipe is to be composed, preparatory to their being mixed. Beneath the hopper is a hollow cylinder, J, in which this mixing is effected. This cylinder rests on suitable journals, working in bearings in the framework, and is capable of being turned round by hand, one object of which is to bring the opening *n* in it, shown in fig. 14, in line with the open bottom of the hopper I, in order to admit of the introduction into the cylinder of the ingredients to be mixed. Through the cylinder runs a shaft, *o*, resting in proper bearings in the framework, and turned by the crank *p*. To this shaft are attached what we call "mixing-pins" and "floats," or, in other words, stirrers, *q* and *q′*, which, when the shaft is rotated, greatly facilitate the mixing, the cylinder, during the operation, being kept stationary.

K is a cistern, placed over one end of the hopper I, and containing water to be used in mixing the ingredients, and *r* is a pipe, running from the cistern, and extending over the hopper, into which, as well as into the cylinder J, through the opening *m*, water may be admitted by the faucet S while the mixing is going on.

L is a stop or projection on the exterior of the cylinder, so arranged that, when the cylinder is revolved sufficiently far to bring the stop against the framework at *t*, the opening *m* in it will be in line with the open bottom of the hopper, so that the ingredients may be put in, and, when in this position, the removable pin *n* inserted through the framework, as seen in fig. 7, so as to hold the cylinder stationary while the mixing is being performed. After the mixing is completed, the cylinder is revolved by hand partly around, in the reverse direction, until the stop strikes the framework at *v*, when the opening *n* will be just over the spout M, so that its contents will be upset or "dumped" into the latter, to be removed to the moulds to form the pipe. When the stop is at *v*, another pin, not seen in the drawing, but operating like the pin *n*, may be inserted through the framework to hold the cylinder stationary while its contents are being dumped.

N N are guides, in which travels a double rack, O O, which is operated by the crank P, which turns the shaft Q, on which is keyed a pinion, R, which meshes into a spur-gear, S, on the pinion-shaft T, the leaves of which latter take into the teeth of the racks, and thereby carry them up or down, according as the crank P is turned.

To the lower ends of the racks O O is secured a concave-headed piston, U, which moves up and down with the racks.

V is a single rack, moving in a guide, W, and operated by the crank X, which turns the shaft Y, on which is keyed pinion *w*, which meshes into a spur-gear, *x*, on another shaft, *y*, which latter carries a second pinion, Z, which takes into the teeth of the rack V, and thereby raises or lowers it.

The piston U constitutes a tamper, for, when the pipe is to be moulded, the mould is brought round on the platform underneath it, and the piston is, by the crank P, driven down at intervals, several times during the moulding-operation, upon the ingredients in the moulds, so as to force them into all parts of the space between the core and the case, and to consolidate them properly together; and, by means of its concave head, it also, when the mould is filled, gives, at its last stroke, the proper convex form to the upper end of the finished pipe.

The rack V constitutes what we term a "core-reliever," for, after each mould has been filled, it is carried, by the platform, underneath this rack, and the latter is then, by the crank X, forced down upon the core C, which is thus driven through the mould and core-socket, and, through the aperture H in the platform, into a pit below.

Any convenient device may be employed, in order to arrest the movement of the platform at the proper points, respectively, to stop the mould under the tamper U and the core-reliever V.

*a**, fig. 4, is a semi-section of a finished pipe as it stands in the mould, and *b* b** are two lengths of finished pipe connected together, as they are when in use.

The operation of our invention is very simple. The platform having been revolved and stopped, so as to bring one of the moulds under the tamper U, the ingredients of which the pipes are to be composed are placed in the hopper I, in such proportions relatively to each other as are suitable, and the cylinder J is rotated until the opening *m* comes beneath the hopper. The cylinder is then stopped and secured in, ingredients are introduced into it, and sufficient water, from the water K, is, from time to time, let in amongst them, through the hopper and the opening *m*, to effect the mixing. The shaft O, with its stirrers, is then turned until the contents of the cylinder are thoroughly mixed, when the cylinder is again rotated partly round, so as to "upset" it, or, in other words, bring the opening *m* over the spout M. The mixture is then dumped into this spout, and carried away with shovels to the mould under the tamper, and thrown into it; and, to facilitate this filling of the mould, we have sometimes constructed them with a flaring or funnel-shaped top, as seen at *c** in fig. 1. The tamper is then operated at intervals, to consolidate the materials while the mould is being filled, and to give the convex form to the upper end of the pipe; and, as soon as the filling is completed, the platform is again revolved and stopped, so as to bring the filled mould under the core-reliever, while the latter is, by the crank X, forced down upon the core, to drive it out into the core-pit. After the core is discharged, the platform is once more revolved, so as to bring the filled mould between the tamper and the hopper I; and the mould is then removed, and the pipe, as soon as it is "set," is taken out, and the mould is returned to the platform for further use. The same operation is repeated with all the moulds in succession.

Our mould may be used without the aid of the machine above described, and in fig. 10 will be seen one mode of so employing it. The mould, with its socket, is placed upon a suitable level base, such as in this figure, which represents a platform or table, 1, having in its top an aperture large enough to receive and hold the core-socket, which, with the rest of the mould, may be held in place in it, in the manner already described. The ingredients, after being properly mixed, may be filled into the mould, and rammed or tamped by hand. 2 is the mould, setting in the aperture in the table, 3 is a post at one side of the table, and 4 is a pin in this post, upon which works a hand-lever, 5. To this lever is attached a vertical rod or core-reliever, 6, which, when the lever is brought over, is forced against the top of the core 7, and drives it, through the mould, core-socket, and table, into a space or pit below the latter. In order to keep the top of the core in proper position during the filling-process, the double ring-clasp 8, upon which a hopper may be placed, may be applied to the top of the mould and core. This arrangement will be found to be very simple, cheap, and convenient.

In the practical use of this portion of our invention, we prefer to have the core-socket constructed as we have shown it in the drawing, that is to say, made separate and distinct from the other parts of the mould, and so formed, and so combined with these other parts, that it is capable of being connected with them when the mould is ready for use, and of being continuously kept connected with them during the entire process of moulding and finishing the pipe, in order to secure the advantages hereinbefore set forth.

We do not confine ourselves to the precise construction of parts shown in the drawing; nor do we limit ourselves to removing the core by forcing it through the mould-case and core-socket while the latter-named two parts remain stationary, as it is evident the core itself may be stationary, and be discharged from the rest of the mould by drawing or otherwise removing the core-socket and mould-case from around it.

Having thus described our inventions, and our mode in which they may be put in practice, what we claim, and desire to secure by Letters Patent, is—

1. A mould, consisting of a case capable of being properly secured around the material while the pipe is being moulded, and of being freed from the pipe when the moulding is completed, in combination with a core, and also with a core-socket, having a provision for freeing the socket or pipe, or both, from the core, the whole operating substantially as set forth.

2. A mould, in which the core-socket is made separate and distinct from the other parts, and so formed, and so combined with such other parts, that it is capable of being connected with them when the mould is ready for use, and of being continuously kept connected with them during the entire process of moulding and finishing the pipe, substantially as and for the purposes described.

3. The arrangement of the mixing-apparatus and of the core-relieving devices above the platform, which conveys the moulds in the manner and for the purpose substantially as specified.

4. The combination of the core-socket with the revolving disk, which receives the core and the mould, when the disk contains a provision for enabling the socket or pipe, or both, to be freed from the core, the whole operating substantially as described.

BRADFORD S. PIERCE,
M. R. PIERCE.

Witnesses:
JOHN R. COOPER,
T. B. BEECHER.